United States Patent [19]
Mahalingaiah et al.

[11] Patent Number: 5,490,059
[45] Date of Patent: Feb. 6, 1996

[54] HEURISTIC CLOCK SPEED OPTIMIZING MECHANISM AND COMPUTER SYSTEM EMPLOYING THE SAME

[75] Inventors: Rupaka Mahalingaiah; Terry Hulett, both of Austin, Tex.

[73] Assignee: Advanced Micro Devices, Inc., Sunnyvale, Calif.

[21] Appl. No.: 300,432

[22] Filed: Sep. 2, 1994

[51] Int. Cl.⁶ .................................................. G06F 1/08
[52] U.S. Cl. ........................ 364/166; 364/550; 395/550
[58] Field of Search ................................. 364/166, 707, 364/550, 557, 488; 395/550, 750; 327/114

[56] References Cited

U.S. PATENT DOCUMENTS

| | | | |
|---|---|---|---|
| 4,812,733 | 3/1989 | Tobey | 364/488 |
| 4,893,271 | 1/1990 | Davis et al. | 395/550 |
| 5,142,684 | 8/1992 | Perry et al. | 395/750 |
| 5,189,314 | 2/1993 | Georgiou et al. | 327/114 |
| 5,287,292 | 2/1994 | Kenny et al. | 364/550 |

*Primary Examiner*—Roy N. Envall, Jr.
*Assistant Examiner*—Steven R. Garland
*Attorney, Agent, or Firm*—B. Noel Kivlin

[57] ABSTRACT

A microprocessor includes a programmable thermal sensor incorporated on an associated semiconductor die for generating a signal indicative of the temperature of the semiconductor die. The control signal is provided to a frequency synthesizer which controls the frequency of the CPU clock signal. The frequency synthesizer is dynamically controlled such that the frequency of the CPU clock signal is varied to run at an optimal frequency while preventing the microprocessor from overheating. In one embodiment, upon reset of the computer system, the clock frequency is set at an initial frequency. The clock frequency is gradually and incrementally increased until the temperature of the semiconductor die reaches a predetermined threshold. The frequency at which the predetermined temperature threshold was reached is then saved, and the operating frequency is reduced by a certain level. Following a period of time if the temperature of the semiconductor die falls below the predetermined threshold, the frequency of the clock signal is again raised to a predetermined amount below the saved frequency at which the temperature of the semiconductor die reached the predetermined threshold. The frequency of the microprocessor clock signal is then held constant until the predetermined maximum threshold temperature is again reached or until a predetermined time period expires, at which times the frequency of the clock signal may be lower or raised, respectively.

13 Claims, 3 Drawing Sheets

5,490,059

HEURISTIC CLOCK SPEED OPTIMIZING MECHANISM AND COMPUTER SYSTEM EMPLOYING THE SAME

BACKGROUND OF THE INVENTION

1. Field of the Invention

This invention relates to computer systems and more particularly to mechanisms and techniques for dynamically managing the clock speed of a microprocessor to enable a computer system to run at an optimal clock frequency without over-heating.

2. Description of the Relevant Art

The frequency of a microprocessor clock signal is an important determinant with respect to the overall performance of a computer system. In general, as the speed of the microprocessor clock signal increases, the time required to execute various instructions decreases. Thus, microprocessors having relatively high internal clock frequencies are desirable for high performance and computational intensive applications.

Unfortunately, the frequency at which a microprocessor clock signal may be driven is limited. In general, as the frequency of the microprocessor clock signal is increased, the amount of heat generated by the microprocessor circuit also increases. If the temperature of the microprocessor chip exceeds a certain threshold, failures may occur. Thus, manufactures typically rate a microprocessor to run at a pre-determined maximum frequency during which the system is guaranteed to operate properly. This pre-determined maximum frequency is usually specified to account for worst-case conditions including worst-case ambient temperatures. Unfortunately, since a microprocessor is typically not operated under worst-case conditions, the performance of the microprocessor is usually not optimized when it is operating at the maximum rated frequency. As a result, the overall performance of the computer system may be degraded.

SUMMARY OF THE INVENTION

The problems outlined above are in large part solved by a heuristic clock speed optimizing mechanism for a computer system in accordance with the present invention. In one embodiment, a microprocessor includes a thermal sensor incorporated on an associated semiconductor die for generating a signal indicative of the temperature of the semiconductor die. The control signal is provided to a frequency synthesizer which controls the frequency of the CPU clock signal. The frequency synthesizer is dynamically controlled such that the frequency of the CPU clock signal is varied to run at an optimal frequency while preventing the microprocessor from overheating. In one embodiment, upon reset of the computer system, the clock frequency is set at an initial frequency. The clock frequency is gradually and incrementally increased until the temperature of the semiconductor die reaches a predetermined threshold. The frequency at which the predetermined temperature threshold was reached is then saved, and the operating frequency is reduced by a certain level. Following a period of time if the temperature of the semiconductor die falls below the predetermined threshold, the frequency of the clock signal is again raised to a predetermined amount below the saved frequency at which the temperature of the semiconductor die reached the predetermined threshold. The frequency of the microprocessor clock signal is then held constant until the predetermined maximum threshold temperature is again reached or until a predetermined time period expires, at which times the frequency of the clock signal may be lower or raised, respectively. The frequency synthesizer may further control the frequency of a system clock signal, and an additional thermal sensor may be coupled to the frequency synthesizer to control the frequency of the system clock signal in accordance with a temperature measured at a second predetermined location within the system. As a result, the frequencies of both the CPU clock signal and the system clock signal may be dynamically optimized in accordance with the operating conditions at a particular time. Furthermore, by optimizing thermal flow within a particular system, a system designer may attain corresponding improvements in overall system performance.

Broadly speaking, the present invention contemplates a computer system comprising a microprocessor fabricated on a semiconductor die and a temperature sensor situated on the semiconductor die for sensing a temperature of the semiconductor die, wherein the temperature sensor provides an output signal indicative of the temperature. A frequency synthesizer capable of generating a CPU clock signal is also provided, wherein the frequency synthesizer is capable of varying a frequency of the CPU clock signal depending upon a command signal. A control unit is further provided which is capable of receiving the output signal from the temperature sensor and is capable of generating the command signal. The control unit generates the command signal such that the frequency of the CPU clock signal is reduced by the frequency synthesizer if a predetermined temperature of the semiconductor die is sensed by the temperature sensor.

The present invention further contemplates a method for adjusting the frequency of a CPU clock signal within a computer system comprising the steps of driving the CPU clock signal at an initial frequency, and sensing a temperature of a semiconductor die associated with the microprocessor. If the temperature of the semiconductor die is below a predetermined threshold, the frequency of the CPU clock signal is increased. If the temperature of the semiconductor die rises above the predetermined threshold, the current frequency of the CPU clock signal is stored and the frequency of the CPU clock signal is reduced to below the stored frequency.

BRIEF DESCRIPTION OF THE DRAWINGS

Other objects and advantages of the invention will become apparent upon reading the following detailed description and upon reference to the accompanying drawings in which.

Figure 1:
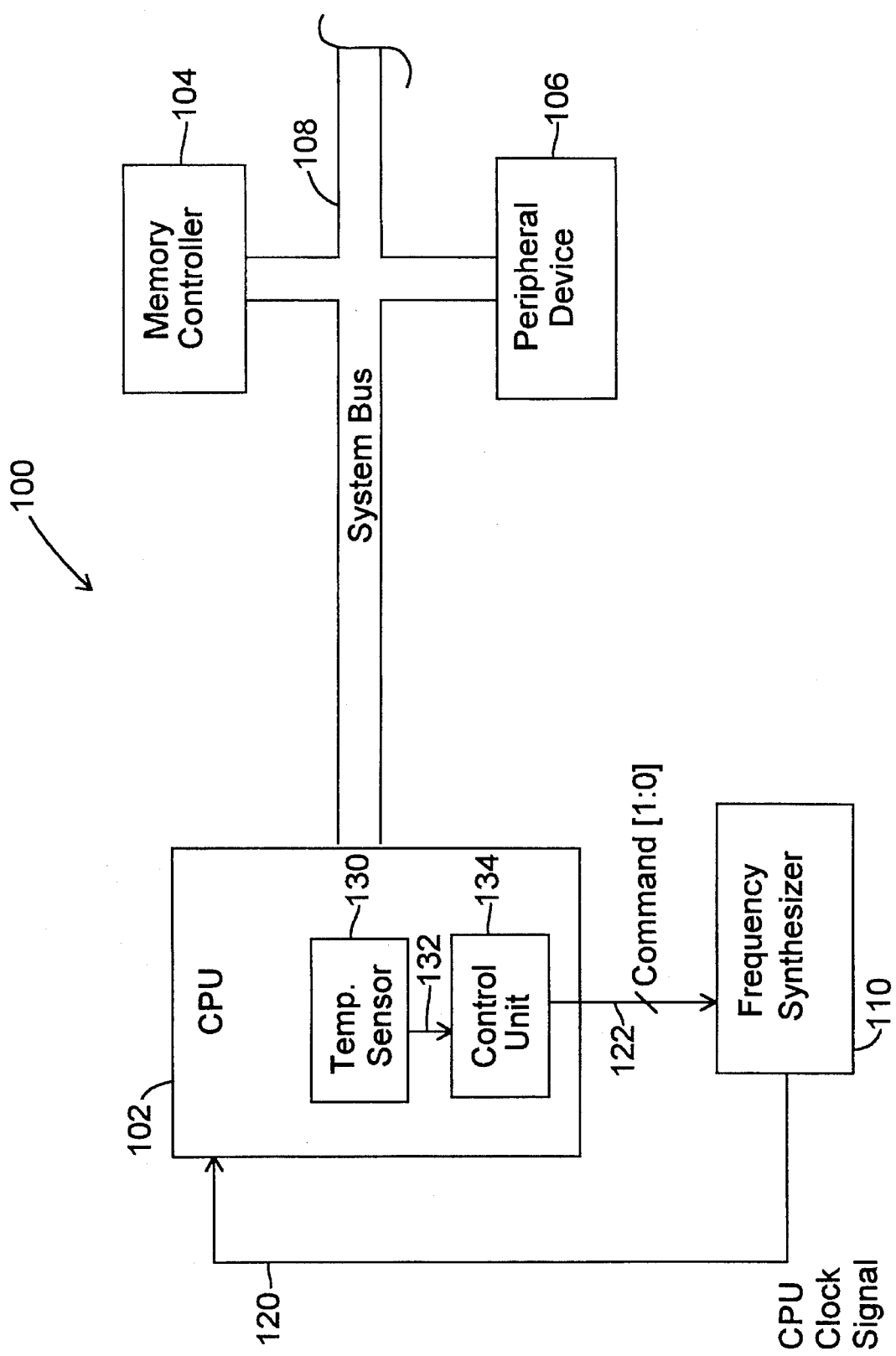
FIG. 1 is a block diagram of a computer system including a heuristic clock speed optimizing mechanism in accordance with the present invention.

While the invention is susceptible to various modifications and alternative forms, specific embodiments thereof are shown by way of example in the drawing and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a computer system 100 that employs a heuristic clock speed optimizing mechanism according to the present invention. As illustrated in the figure, computer system 100 includes a microprocessor (CPU) 102 coupled to a memory controller 104 and to a peripheral device 106 via a system bus 108. A frequency synthesizer 110 is further coupled to microprocessor 102.

Microprocessor 102 is a data processing unit that implements a predetermined instruction set. Exemplary processing units include the models 80386 and 80486 microprocessors, among others. Peripheral device 106 is illustrative of a variety of peripheral components, such as a DMA controller, an interrupt controller, or a timer. It is noted that memory controller 104 and peripheral device 106 may be fabricated on integrated circuits that are manufactured as chip sets to be accompanied with microprocessor 102. Alternatively, memory controller 104 and/or peripheral device 106 could be incorporated on a common semiconductor die with microprocessor 102.

In its illustrated form, frequency synthesizer 110 is external from microprocessor 102. It is understood, however, that frequency synthesizer 110 could be embodied as an integral part of microprocessor 102. Similarly, control unit 134 could be embodied separately from microprocessor 102.

During operation, frequency synthesizer 110 generates a CPU clock signal at a line 120 which is received by microprocessor 102 and which is used for generating an internal microprocessor clock signal. As will be better understood from the following, frequency synthesizer 110 is capable of varying the frequency of the CPU clock signal at line 120 based upon a command signal labeled Command [1:0] from microprocessor 102 at line 122.

Microprocessor 102 includes a temperature sensor 130 situated on the semiconductor die of which microprocessor 102 is physically fabricated. During operation, temperature sensor 130 provides an output signal at line 132 which is received by a control unit 134. It is understood that the output signal from temperature sensor 130 could be either digital or analog. Control unit 134 generates the two-bit control signal Command [1:0] depending upon the output signal from temperature sensor 130.

Table 1 below illustrates the possible states of the Command [1:0] signal as generated by control unit 134 and the action taken by frequency synthesizer 110 in response to each state. As illustrated in the table, the Command [1:0] signal may cause the frequency synthesizer 110 to either increase the frequency of the CPU clock signal, to decrease the frequency of the CPU clock signal, or to hold the frequency of the CPU clock signal.

TABLE 1

| Command [1:0] | Action |
| --- | --- |
| 00 | Increase the frequency |
| 01 | Decrease the frequency |
| 11 | Hold the frequency |

The control unit 134 as illustrated in FIG. 1 may be implemented entirely through hardware or in part via software executed within microprocessor 102. One software program which may be used to implement a portion of control unit 134 is indicated as follows:

Variables:

| | |
| --- | --- |
| step_size: | frequency increments: |
| step_time: | stabilization time in each step; |
| reduction_factor: | controls the slope of frequency decrements; |
| Command [1:0]: | condition as defined in Table 1; |
| current_frequency: | the frequency at any evaluation: = initial_frequency; |
| too_hot_frequency: | most recent frequency at which the silicon over heated: = ∞; |
| too_hot_time: | time elapsed since the last too_hot condition: = 0; |
| cool_time: | time for resetting the too_hot_frequency; |
| too_hot: | signal from thermal sensor; |

The Algorithm:

```
loop (forever)
    IF (((current_frequency + step_size) < too_hot_frequency) &
        (too_hot = 0)) THEN
        BEGIN
            command: = 00; increment the frequency by step_size
            wait for step_size;
        END;
    ELSE IF (too_hot = 1) THEN
        BEGIN
            too_hot_frequency: = current frequency;
            too_hot_time: = 0;
            command: = 01; decrement frequency by
                (reduction_factor * step_size)
            wait for step_time;
        END;
    ELSE
        BEGIN
            command: = 11; hold the frequency
            wait for step_time;
        END;
        END IF;
    IF (too_hot_time > cool_time)
        too_hot_frequency: = ∞;
    ELSE
        increment (too_hot_time);
    END IF;
END LOOP;
```

The variables defined within the above program listing are provided to specify and/or track various operational parameters of control unit 134 and frequency synthesizer 110. More specifically, the variable "step size" specifies the size (i.e., the extent) of each frequency increment associated with frequency synthesizer 110, the variable "step time" sets the stabilization time which is provided following a particular change in frequency, and the variable "reduction factor" controls the slope of the frequency decrements. The variable "current frequency" indicates the current frequency of the frequency synthesizer 110, and the variable "too hot frequency" indicates the most recent frequency at which the silicon over heated (i.e., the frequency at which the temperature of the semiconductor die reached a predetermined maximum threshold). Finally, the variable "too hot time" indicates the time elapsed since the last too hot condition, and the variable "cool time" indicates the time for resetting the too hot frequency. The variable "too hot" represents a single-bit digital value from temperature sensor 130. If the semiconductor die is below the predetermined maximum threshold, the variable "too hot" is low. If the temperature reaches or exceeds the predetermined threshold, temperature sensor 130 drives the "too hot" signal (at line 132) high.

Upon reset of computer system 100, the CPU clock signal frequency is set at a predetermined "initial frequency" Following a stabilization time as determined by the variable "step time", the frequency of the CPU clock signal is incremented by one "step size" if the temperature sensor 130 does not indicate that the temperature of the microprocessor die has reached the predetermined maximum threshold (i.e., if the output signal from temperature sensor 130 is low). For example, in one embodiment the "initial frequency" may be set at 30 MHz, the variable "step time" may be set at 30 seconds, the variable "step size" may be set at 5 MHz, and the predetermined maximum temperature may be considered to be 85° C. Upon reset of the computer system 100, the frequency synthesizer 110 initially drives the CPU clock signal at line 120 at a frequency of 30 MHz. Following the "step time" of 30 seconds, if the temperature sensor 130 indicates that the temperature of the semiconductor die is below the maximum temperature of 85° C., the Command [1:0] signal is driven with a value of "00" which causes the frequency synthesizer 110 to increase the CPU clock signal 120 by 5 MHz ("step size"). It is noted that a transmit signal may be provided from control unit 134 to frequency synthesizer 110 each time a new Command [1:0] value is generated by control unit 134.

The steps of waiting for the stabilization time of 30 seconds to expire as specified by the variable "step time" and of incrementing the frequency of the clock signal by 5 MHz (as specified by "step size") are repeated until the temperature of the semiconductor die increases above the predetermined maximum temperature. At this point, the "too hot" value will be binary high. This causes control unit 134 to store a value representative of the current frequency of the CPU clock signal within the variable location "too hot frequency". Control unit 134 further resets the variable "too hot time" and drives the Command [1:0] signal with a value of "01" to indicate that the frequency of the CPU clock signal should be decreased. The extent of this frequency decrement may be some factor of the value of each incremental step associated with frequency synthesizer 110 (i.e., reduction factor * step size), and is controlled by frequency synthesizer 110. If the temperature of the semiconductor die does not fall below the predetermined maximum threshold following one "step time" period, control unit 134 causes the frequency of the CPU clock signal to be decremented further. These steps repeat until the temperature falls below the predetermined maximum threshold.

For example, if upon several iterations of raising the CPU clock signal by 5 MHz, the temperature of the semiconductor die reaches or exceeds 85° C. when the frequency of the CPU clock signal is at 65 MHz, the control unit will drive the Command [1:0] signal with the value "01" to reduce the frequency of the CPU clock signal. After another "step time" period if the temperature of the microprocessor is still not below the predetermined maximum, the frequency is again reduced. This process is repeated until the temperature falls below the predetermined maximum. Any time a "too hot condition" is detected, the "too hot frequency" is reset to that frequency.

It is noted that initially the variable "too hot" frequency is set at infinity (i.e., or to some other functionally equivalent value). When the temperature of the semiconductor die reaches or exceeds the predetermined maximum threshold as determined by the temperature sensor 130, the variable "too hot frequency" is assigned a value indicative of the current frequency. Subsequently, when the frequency of the microprocessor clock signal is reduced and the semiconductor die temperature again falls below the predetermined maximum threshold, the frequency is again incrementally increased (following one or more "step time" periods) to a frequency which is one "step size" below the stored "too hot frequency" (provided that the temperature sensor does not indicate that the maximum threshold temperature has again been reached). Accordingly, the frequency of the CPU clock signal will be advantageously set at a value which is just below (i.e., one "step size") the frequency at which the temperature reached the predetermined maximum threshold.

It is also noted that if a too hot condition is not detected for a predetermined amount of time (i.e., as determined by the variable "cool time"), the "too hot frequency" variable may be set to infinity (or to some other functionally equivalent value). For this situation, a maximum frequency of the CPU clock signal may be set or limited in accordance with other operational parameters of the microprocessor 102.

Figure 2:
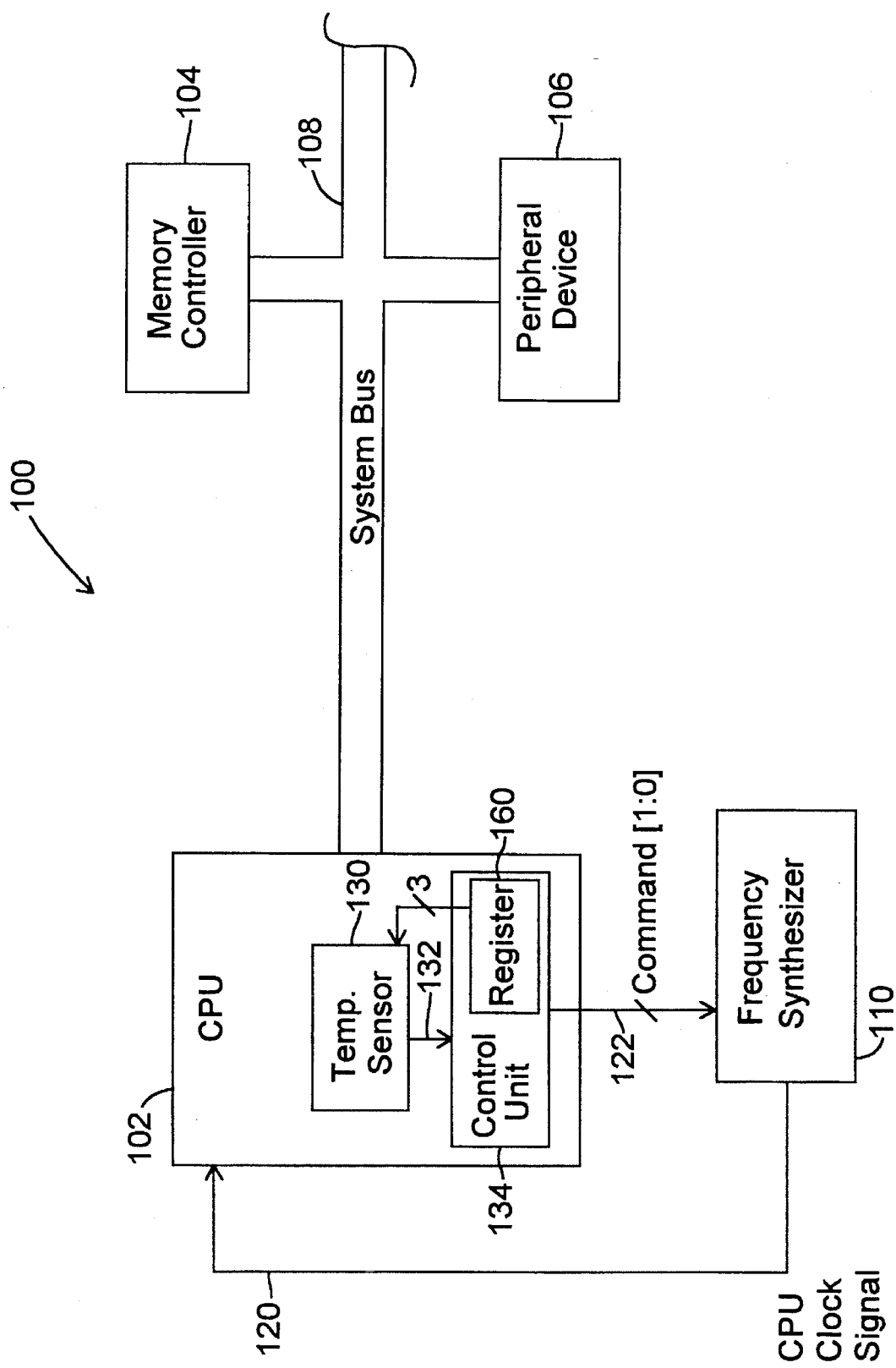
FIG. 2 is a block diagram of a computer system including a heuristic clock speed optimizing mechanism in accordance with a second embodiment of the present invention.

In one embodiment, several operational characteristics of frequency synthesizer 110 are programmable, such as the variable "step size" and the variable "reduction factor". Frequency synthesizer 110 may be coupled to system bus 108 to accommodate these programming functions. In yet another embodiment as illustrated in FIG. 2, temperature sensor 130 is programmable such that the threshold temperature at which the "too hot" signal at line 132 is generated may be varied or selectively set via software control. For the specific implementation of FIG. 2, a software programmable register 160 is associated with control unit 134 which provides a 3-bit binary value to temperature sensor 130. The 3-bit binary value provided from register 160 determines the specific threshold temperature at which the output of temperature sensor 130 at line 132 will be asserted high. Accordingly, the maximum threshold temperature may be varied from system to system, or the maximum threshold temperature may be varied according to other system parameters, such as the current CPU clock frequency. It is noted that the programmable register 160 may be mapped within either the memory space, the I/O space or the configuration space of computer system 100.

Figure 3:
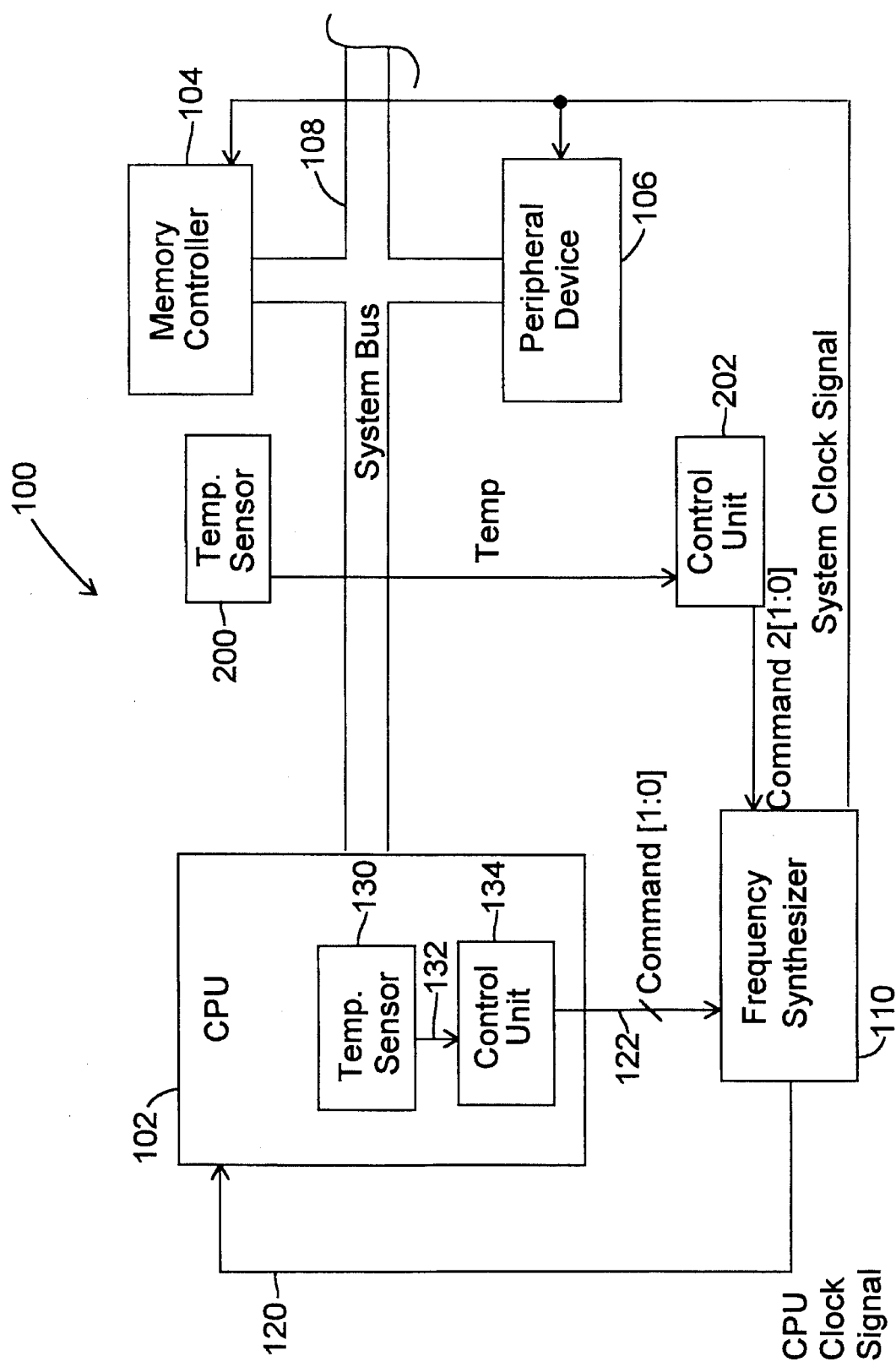
FIG. 3 is a block diagram of a computer system including a heuristic clock speed optimizing mechanism in accordance with a third embodiment of the present invention.

Referring next to FIG. 3, a block diagram is shown of a computer system including a heuristic clock speed optimizing mechanism according to a third embodiment of the present invention. Circuit portions that correspond to those of FIG. 1 are numbered identically for simplicity.

For the system of FIG. 3, a second temperature sensor 200 is provided remotely within the system to measure a temperature associated with the system such as memory controller 104 and/or peripheral device 106. In this embodiment, frequency synthesizer 110 generates both a CPU clock signal and a system clock signal. The system clock signal is provided to clock a memory controller 104 and peripheral device 106. A second control unit 202 is coupled to the second temperature sensor 200 for generating a command signal labeled Command 2[1:0]. The operation of the second control unit 202 is identical to that of control unit 134, and the response to the Command 2[1:0] signal by frequency synthesizer 110 and its associated control of the system clock signal is similar to that for the CPU clock signal. It is noted, however, that the frequency of the system clock signal is typically less than that of the CPU clock signal.

In an alternative embodiment, the second temperature sensor 200 and the control unit 202 may be omitted, and the system clock signal may be varied in accordance with the Command [1:0] signal in the same manner as the CPU clock signal.

Numerous variations and modifications will become apparent to those skilled in the art once the above disclosure is fully appreciated. For example, while the control unit 134 is implemented in accordance with the software program listed above, it is understood that control unit 134 could be implemented in accordance with other software routines, or in hardware. It is intended that the following claims be interpreted to embrace all such variations and modifications.

What is claimed is:

1. A computer system comprising:

a microprocessor fabricated on a semiconductor die;

a temperature sensor situated on said semiconductor die for sensing a temperature of said semiconductor die, wherein said temperature sensor provides an output signal indicative of said temperature;

a frequency synthesizer capable of generating a CPU clock signal associated with said microprocessor, wherein said frequency synthesizer is capable of varying a frequency of said CPU clock signal depending upon a command signal; and a control unit capable of receiving said output signal from said temperature sensor and capable of generating said command signal, wherein said control unit generates said command signal such that the frequency of said CPU clock signal is reduced by said frequency synthesizer if a predetermined threshold temperature of said semiconductor die is sensed by said temperature sensor, and wherein said control unit is configured such that a value representative of a threshold frequency at which said semiconductor die reaches said predetermined threshold temperature is stored within a memory unit, and further wherein, if said temperature of said semiconductor die falls below said predetermined threshold temperature after said frequency of said CPU clock signal is reduced, said control unit increases the CPU clock signal to a predetermined frequency below said threshold frequency.

2. The computer system as recited in claim 1 wherein said control unit is incorporated as an integrated part of said microprocessor.

3. The computer system as recited in claim 1 wherein said control unit is embodied in part by software code executed by said microprocessor.

4. The computer system as recited in claim 1 further comprising a memory control unit coupled to said microprocessor.

5. The computer system as recited in claim 1 wherein said frequency synthesizer is capable of generating a system clock signal, wherein said system clock signal is provided to a memory control unit.

6. The computer system as recited in claim 5 wherein said system clock signal is varied by said frequency synthesizer depending upon said command signal.

7. The computer system as recited in claim 5 further comprising a second temperature sensor for sensing a second temperature associated with said computer system, wherein said frequency synthesizer is capable of varying the frequency of said system clock signal depending upon said second temperature.

8. The computer system as recited in claim 1 wherein said predetermined threshold temperature is programmable.

9. A method for adjusting the frequency of a CPU clock signal within a computer system comprising the steps of:

driving said CPU clock signal at an initial frequency;

sensing a temperature of a semiconductor die associated with said microprocessor;

if said temperature of said semiconductor die is below a predetermined threshold, increasing a frequency of said CPU clock signal; and if said temperature of said semiconductor die rises above said predetermined threshold, storing a current frequency of said CPU clock signal and reducing said frequency of said CPU clock signal.

10. The method as recited in claim 9 comprising the further step of:

raising the frequency of said CPU clock signal after said temperature of said semiconductor die drops below said predetermined threshold value;

11. The method as recited in claim 10 wherein said step of increasing said frequency of said CPU clock signal includes the step of raising the frequency of said CPU clock signal to a frequency which is a predetermined amount below said stored frequency.

12. The method as recited in claim 11 comprising the further steps of:

driving a system clock signal at an initial frequency; and raising the frequency of said system clock signal if said temperature of said semiconductor die is below said predetermined threshold.

13. The method as recited in claim 12 comprising the further step of decreasing the frequency of said system clock signal if said temperature of said semiconductor die rises above said predetermined threshold.

* * * * *